US007548557B2

(12) United States Patent
Hom

(10) Patent No.: US 7,548,557 B2
(45) Date of Patent: Jun. 16, 2009

(54) METHOD AND APPARATUS FOR ACCESS CONTROL SYSTEM MESSAGE CONVEYANCE

(75) Inventor: Wayne C. Hom, Rancho Santa Margarita, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 955 days.

(21) Appl. No.: 10/838,869

(22) Filed: May 4, 2004

(65) Prior Publication Data

US 2005/0249182 A1 Nov. 10, 2005

(51) Int. Cl.
*H04J 3/16* (2006.01)

(52) U.S. Cl. ....................................... 370/465; 370/471

(58) Field of Classification Search ................. 370/346, 370/338, 465, 347, 349, 328, 471, 356, 277, 370/276; 455/556.1, 41.2, 419; 375/259; 340/431

See application file for complete search history.

(56) References Cited

U.S. PATENT DOCUMENTS 4,860,292 A 8/1989 Newman et al.
4,941,115 A 7/1990 Nihart et al.
5,111,497 A 5/1992 Bliven et al.
5,473,318 A 12/1995 Martel
5,886,894 A 3/1999 Rakoff
6,256,355 B1 * 7/2001 Sakoda et al. ............... 375/259
6,282,451 B1 8/2001 White
7,248,893 B2 * 7/2007 Christensen et al. ...... 455/556.1
2001/0047213 A1 11/2001 Sepe, Jr.

OTHER PUBLICATIONS

Search Report for Application No. GB0508978.4, issued Jun. 14, 2005.

* cited by examiner

*Primary Examiner*—Chi H Pham
*Assistant Examiner*—Alexander Boakye
(74) *Attorney, Agent, or Firm*—Fitch Even Tabin & Flannery

(57) ABSTRACT

An access control system and one or more remote user interfaces that communicate with one another via nine bit messages are able to wirelessly communicate with one another via conversion of such nine bit messages into multiple corresponding eight bit message. In a preferred approach, information from the original nine bit message that indicates a message type is segregated to one such eight bit message.

25 Claims, 4 Drawing Sheets

METHOD AND APPARATUS FOR ACCESS CONTROL SYSTEM MESSAGE CONVEYANCE

FIELD OF THE INVENTION

This invention relates generally to access control systems and more particularly to communications between such a system and a remote user interface.

BACKGROUND OF THE INVENTION

Access control systems of various kinds are known in the art. Some access control systems control the automated operation of a movable barrier (such as but not limited to a single piece or segmented garage door or doors of other sorts, a pivoting or sliding gate, arm guards, rolling shutters, and the like) and some control some other aspect of an entry control mechanism (such as but not limited to a remote lock control system and the like). In many cases, the access control system includes an operator (such as a movable barrier operator) that interacts in useful ways with one or more remote user interfaces. For example, the remote user interface can provide a mechanism to permit a user to enter an operating or identifying code via a keypad or by presenting a card having such information encoded thereon.

In some deployments, such a remote user interface may be located a considerable distance from the access control system itself. For example, the remote user interface may be disposed at an entry gate that is many hundreds of feet from a garage or other facility that houses the operator for the access control system. Therefore, such remote user interfaces are often coupled to the access control system by an RS-485 compatible wireline linkage. Those skilled in the art will recognize that the conductor configuration and voltage levels that characterize the RS-485 standard are well suited to the reliable conveyance of relatively long distance control signaling of this type. As a result, such an approach often serves these purposes well.

There are instances, however, when a wireline linkage between an access control system and a remote user interface is difficult to provide. Local elements (such as walls, driveways, bodies of water, and the like) may present physical obstacles to a concealed deployment of the RS-485 wireline link while an exposed deployment may be objectionable on security and/or aesthetic grounds.

Notwithstanding such difficulties, wireless solutions have not been readily adapted as a substitute in many such settings. This is due, at least in part, to the nature of the control signaling itself in many such systems. For example, many such systems convey nine bit messages as between such elements as an access control system platform and a remote user interface. RS-485 readily supports such a message. Unfortunately, many off-the-shelf wireless solutions are not so amenable. In many cases this legacy message format protocol presents a significant point of incompatibility and discourages use of a wireless solution.

BRIEF DESCRIPTION OF THE DRAWINGS

The above needs are at least partially met through provision of the method and apparatus for access control system message conveyance described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

Generally speaking, pursuant to these various embodiments, a received message from an access control system consisting of nine bits of information is processed and a resultant corresponding message wirelessly transmitted to a remote user interface. The received message is processed to provide to the remote user interface a message that consists of the original nine bits of information.

In a preferred approach, eight of the original nine bits are parsed and comprise a first eight bit packet. The remaining ninth bit, which preferably comprises a message type indicator, comprises a part of a second eight bit packet. So configured, both polling query types of messages and data transfer types of messages are readily accommodated. These eight bit packets are readily and compatibly accommodated by various off-the-shelf wireless solutions. At the same time, the ability of this approach to begin and end with nine bit packets aids in ensuring compatible usage with legacy (and future deployed) systems that make use of such formatting.

These and other benefits will become more evident to those skilled in the art upon making a thorough review and study of the following detailed description.

Figure 1:
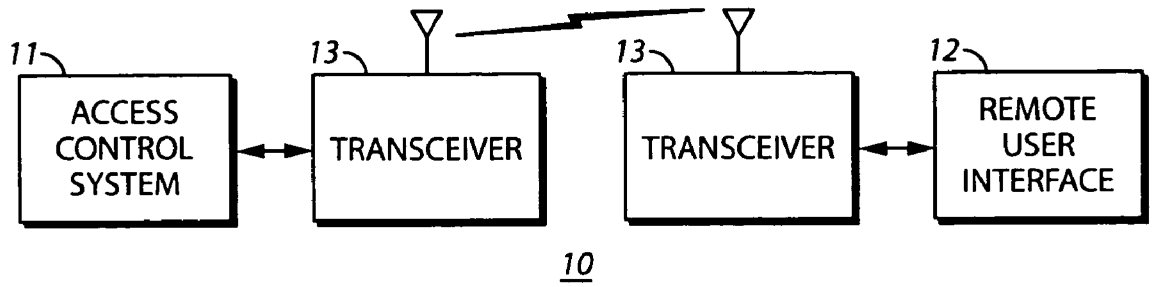
FIG. 1 comprises a block diagram as configured in accordance with various embodiments of the invention.

Referring now to the drawings, and in particular to FIG. 1, a typical overall system 10 as pertinent to these teachings will often comprise an access control system 11 that operably couples to at least one remote user interface 12 by a wireless link supported by corresponding transceivers 13. The access control system 11 can be any of a wide variety of such systems including movable barrier operators, lock control mechanisms, and so forth. Similarly, the remote user interface 12 can be any of a wide variety of user input and information provision platforms including but not limited to keypads, buttons, audio-response devices, radio frequency identification tag readers, optical code scanners, magnetic strip readers, weight sensors, light beam sensors, ultrasonic sensors, magnetic anomaly sensors, displays, and so forth. The particular embodiments employed are not especially relevant and those skilled in the art will understand and appreciate that these teachings are applicable to all such platforms as may be presently known or hereafter developed.

It will be noted, however, that in these embodiments, the access control system 11 and the remote user interface 12 provide as an output and expect to receive as an input messages that comprise nine bit words, packets, or messages. More detail regarding such messages will be provided below where appropriate. It will also be understood that, in a preferred embodiment, these nine bit message packets are communicated via the RS-485 standard (which typically stipulates two electrical conductors and specific voltage levels).

In general, the access control system 11 sends one of two types of message. A first type of message comprises polling query type of message. This kind of message serves to identify a given remote user interface and to prompt that remote user interface to upload to the access control system 11 such data as the remote user interface may presently have. For example, when polled, the remote user interface may provide information reflecting the current status of an assertable button or information identifying a presently asserted key. The second type of message comprises a data transfer type of message. This kind of message provides data to the recipient. For example, the access control system can provide information via this type of message to the remote user interface to facilitate local display of that information to a user. As another example, a remote user interface can use this type of message to facilitate its response to a polling inquiry from the access control system.

Pursuant to one approach, each transceiver 13 can be comprised of essentially the same platform. Via a user-selectable switch, however, a given transceiver 13 can be configured to function in any of a plurality of operating modes to thereby facilitate, for example, serving on behalf of an access control system 11 or a remote user interface 12.

Figure 2:
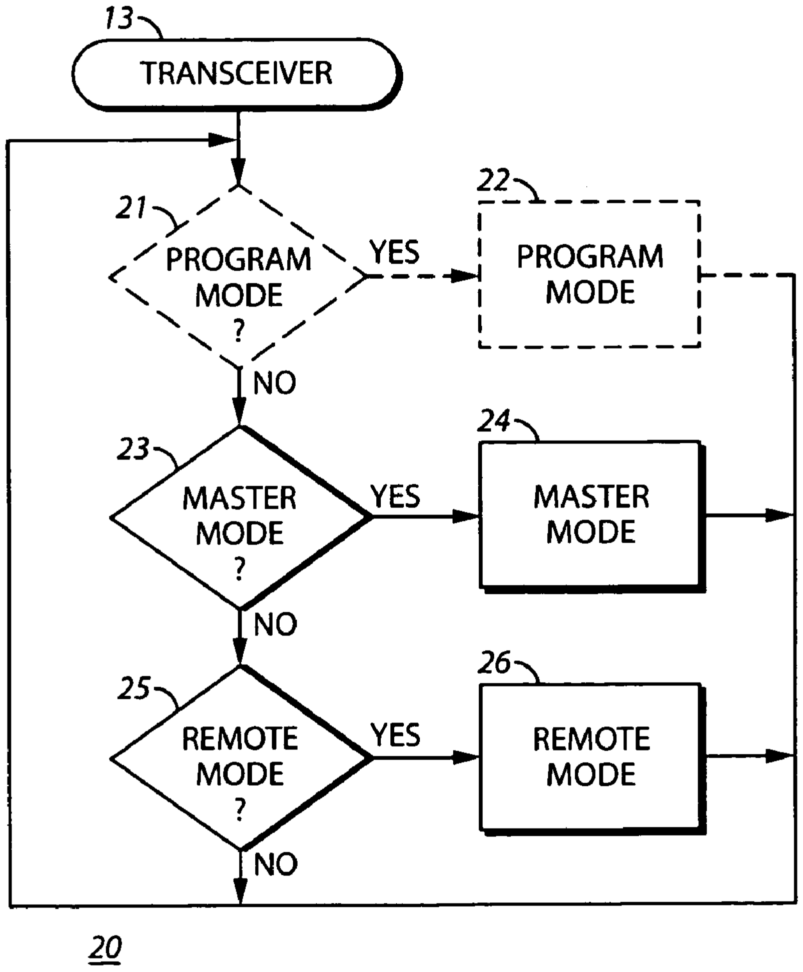
FIG. 2 comprises a flow diagram as configured in accordance with various embodiments of the invention.

With reference now to FIG. 2, an enabling process 20 to facilitate such flexibility can optionally determine 21 whether a user-selectable switch has been set to a "program" mode of operation. Such a mode might be used to support a variety of purposes including a learning mode of operation, a configuration mode of operation, and the like. When such a mode has been selected, the transceiver 13 can respond by effecting a corresponding program mode 22 of operation.

Figure 3:
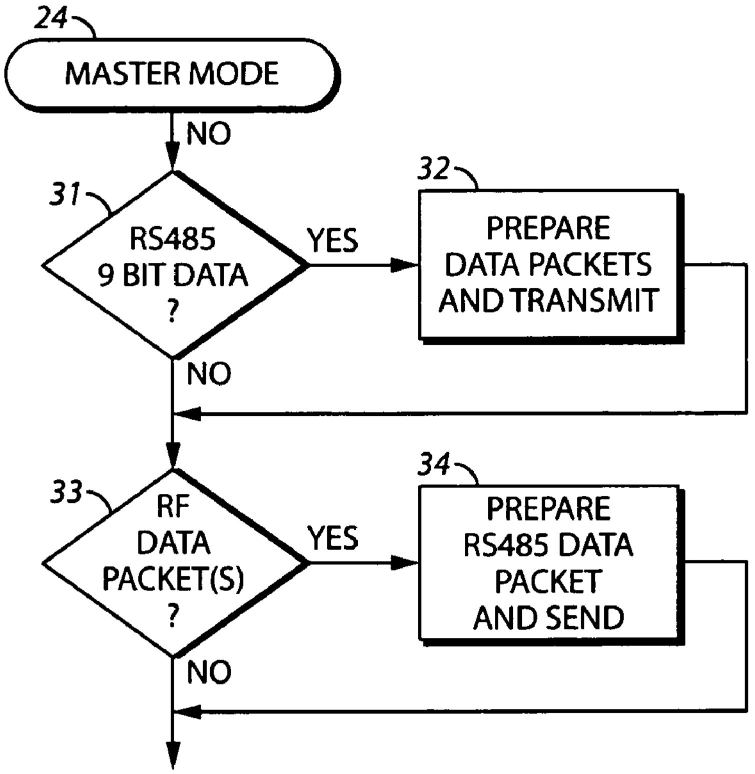
FIG. 3 comprises a flow diagram as configured in accordance with various embodiments of the invention.

This process 20 can next determine 23 whether a "master" mode of operation has been selected by a user. When true, the transceiver can effect a corresponding master mode 24 of operation. Such a mode can comprise, for example, a mode of operation that suits use of the transceiver 13 in combination with an access control system 11. For example, and referring momentary to FIG. 3, the master mode 24 of operation can comprise detecting 31 the receipt of RS-485 nine bit data from an access control system and an automated preparation 32 of corresponding data packets that are then transmitted to a designated remote user interface. This master mode 24 of operation can also comprise detecting 33 receipt of data packet(s) from a remote user interface and an automated preparation 34 of RS-485 compliant nine bit data and provision of such data to the access control system.

Referring again to FIG. 2, the transceiver process 20 can also determine 25 when a "remote" mode of operation has been selected by a user. When true, the transceiver process 20 can effect a corresponding remote mode 26 of operation. Such a mode can permit such a transceiver 13 to function well in combination with, for example, a remote user interface in a similar manner to that described above for the master mode 24 of operation. So configured, the remote mode can, for example, permit the transceiver 13 to determine when a polling request or a data packet has been received from the access control system and to convert such messages into corresponding RS-485 nine bit data messages for the remote user interface. This mode can also serve to convert RS-485 nine bit data responses from the remote user interface into corresponding data suitable for wireless transmission to the access control system transceiver.

Figure 4:
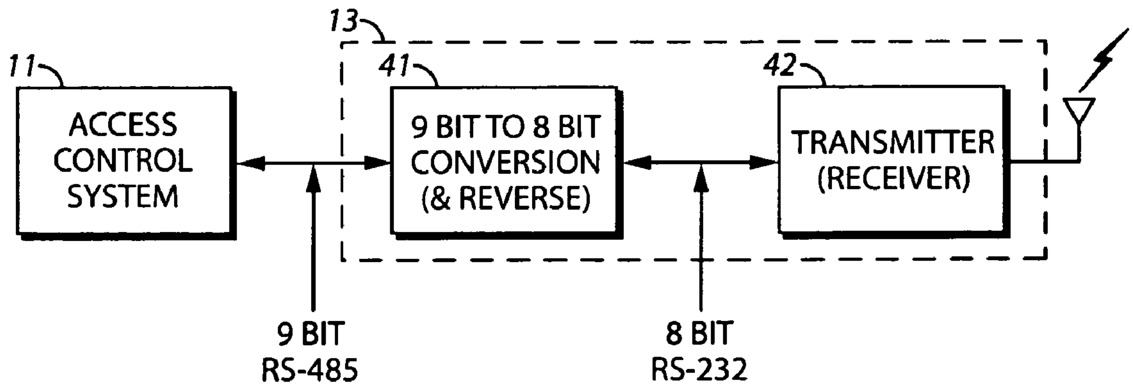
FIG. 4 comprises a block diagram as configured in accordance with various embodiments of the invention.

As noted earlier (and referring now to FIG. 4), in these embodiments, the access control system 11 (and the remote user interface 12) source, and expect to receive nine bit RS-485 compatible data messages. In a preferred approach, therefore, the transceiver 13 comprises a transmitter 42 (which also comprises a receiver in a preferred embodiment) and a nine bit to eight bit converter 41 that operably couples between the access control system 11 (or remote user interface 12) and the transmitter 42. The nine bit to eight bit converter 41 serves, in part, as an RS-485 interface to facilitate reception of nine bit RS-485-compliant messages from the access control system 11.

Pursuant to a preferred approach, this converter 41 also serves to translate the RS-485 compliant signaling at its input to RS-232 compliant signaling at its output to ensure compatibility with the transmitter 42. As will be shown below in more detail, in a preferred embodiment the nine bit to eight bit converter 41 serves to convert nine bit messages provided by the access control system 11 into corresponding eight bit packets to be transmitted by the transmitter 42.

The transmitter 42 can comprise any suitable wireless platform but will typically comprise a radio frequency-based platform using a frequency (or frequencies), modulation technique, and broadcast power as selected for use to best suit a given need and setting in accord with well understood prior art technique.

Figure 5:
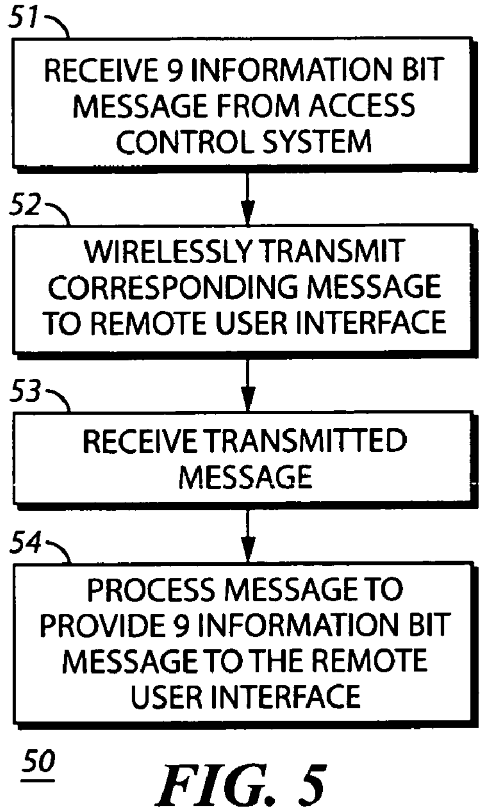
FIG. 5 comprises a flow diagram as configured in accordance with various embodiments of the invention.

Referring now to FIG. 5, such platforms as those presented above, or such others as may be preferable in a given application, can facilitate a process 50 wherein messages comprising nine information bits are received 51 from an access control system. Such nine information bit messages are known in the art.

Figure 6:
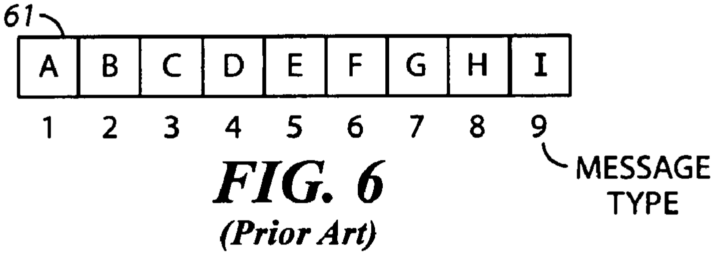
FIG. 6 (Prior Art)
FIG. 6 comprises a schematic depiction of a message packet as configured in accordance with the prior art.

FIG. 6 presents a schematic depiction of such a nine information bit message 61. In a preferred embodiment, eight of the information bits (such as information bits 1 through 8) can convey bearer data, information to identify a specific target recipient (such as a target remote user interface recipient), and so forth. The ninth information bit (such as information bit 9) can specify a message type. For example, this ninth information bit can specify whether the remainder of the message 61 comprises a polling query type or a data transfer type. Other message types could be accommodated in a given application, but in a preferred approach these messages comprise either of only two types of message (and hence only a single information bit is necessary to distinguish between the two). So configured, the ninth information bit identifies the type of message as is being conveyed by the remaining eight information bits of the message 61.

Figure 7:
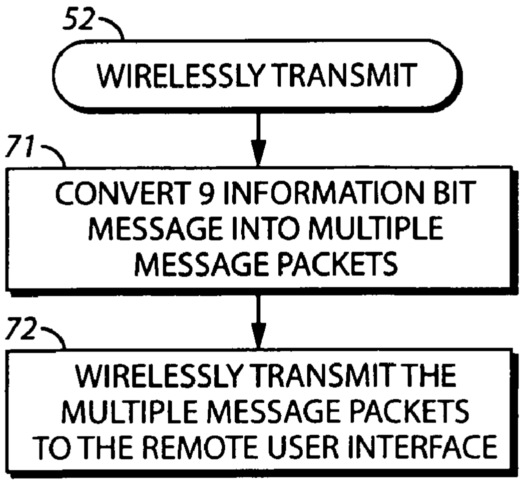
FIG. 7 comprises a flow diagram as configured in accordance with various embodiments of the invention.

Referring again to FIG. 5, this process 50 then provides for wireless transmission 52 of a message to one or more of the remote user interfaces. This message corresponds to the nine information bit message received earlier in the process 50. This transmission activity can be accommodated in a variety of ways. Pursuant to a preferred approach, and referring now momentarily to FIG. 7, this action 52 can comprise converting 71 the nine information bit message into multiple corresponding message packets. In a preferred embodiment these multiple message packets comprise eight bit message packets. Accordingly, pursuant to one approach, this process converts each nine bit message into two eight bit message packets.

Figure 8:
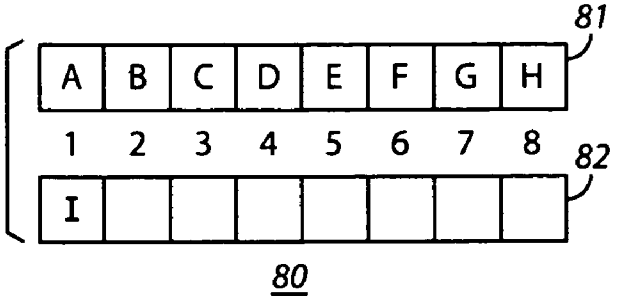
FIG. 8 comprises a schematic depiction of two message packets as configured in accordance with various embodiments of the invention.

To illustrate, and referring momentarily to FIG. 8, the message (and/or identifier) portion of the nine information message (i.e., the first eight information bits 1 through 8 as described above with respect to FIG. 6) can be placed in a first eight bit message 81 and the ninth bit of information (which preferably corresponds to the message type as related above) is placed in a second eight bit message 82. So configured, and pursuant to one such embodiment, one of the two eight bit message packets 81 represents eight bits of information from the original nine information bits and another of the two eight bit message packets 82 represents only the information contained in the ninth bit.

Referring again to FIG. 7, these multiple message packets are wirelessly transmitted 72 to the remote user interface(s). For example, in many of the embodiments described above, the nine information bits received via RS-485 are converted into two corresponding eight information bit packets that are provided to the transmitter platform via RS-232. The transmitter, in turn, will typically convert such RS-232 compliant signaling into a message format that is not RS-232 compliant but that conforms to a protocol of choice for efficient wireless signaling.

Referring now again to FIG. 5, this overall process 50 also provides for the receipt 53 of these messages by the remote user interfaces. Upon receiving such a message, this process 50 then processes 54 the received information to permit provision of the original nine information bits to the remote user interface. Those skilled in the art will recognize that this process can essentially comprise the reverse of the process described earlier.

Figure 9:
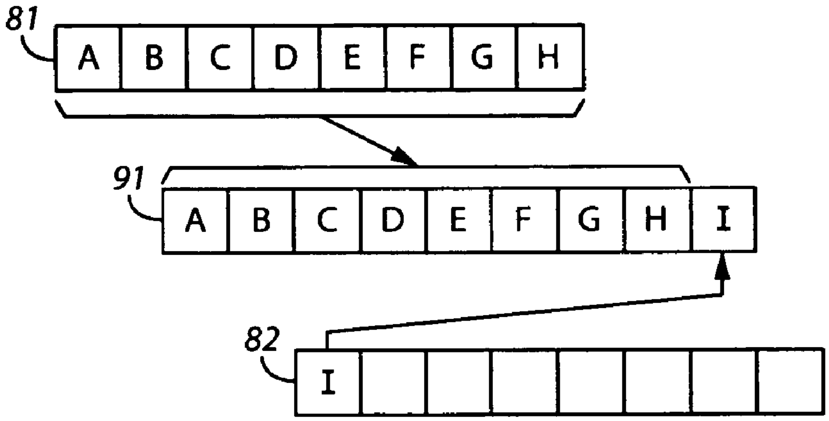
FIG. 9 comprises a schematic depiction of message packet reconstruction as configured in accordance with various embodiments of the invention.

To illustrate, and referring now to FIG. 9, this process can comprise, in a preferred approach, a selective combination of the contents of the two eight information bit message packets 81 and 82. By properly combining bits as selected from each of the first and second data packets 81 and 82, one can readily reconstitute the original nine bits of information and provide a resultant nine bit message 91. Accordingly, when eight of the original nine bits are present in a first packet 81, those eight bits can be returned to their original position in a nine bit format. Similarly, when the second data packet 82 contains only the ninth original bit, that one bit can be returned to its original position in the nine bit format.

So configured, a wireless link can be reliably deployed between an access control system and a remote user interface. This wireless link can be realized through use of standard, non-customized wireless endpoints that employ, for example, non-RS-485 signaling and that utilize eight bit packets. This, in turn, permits significant economies of scale to be realized by allowing selection and use of commonly available wireless technology and platforms. At the same time, legacy systems and designs can remain deployed and in production, thereby avoiding the costs and concerns of re-installation and/or re-design.

Figure 10:
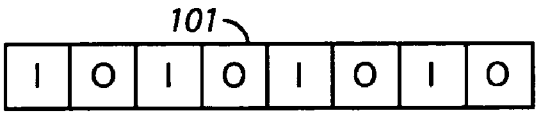
FIG. 10 comprises a schematic depiction of a message packet as configured in accordance with various embodiments of the invention.
Figure 11:
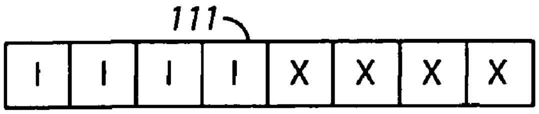
FIG. 11 comprises a schematic depiction of a message packet as configured in accordance with various embodiments of the invention.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, in the embodiments presented above, the message type information is represented in the original nine bit message by a single bit and is also represented in the resultant multi-packet message by an identical single bit. If desired, however, such message type information can be mapped to a multi-bit symbol or to a multi-bit expression. To illustrate, FIG. 10 provides a depiction of a second eight bit packet wherein the sequence "10101010" serves to identify a polling message type. As another illustration, FIG. 11 provides a depiction of a second eight bit packet wherein the sequence "1111" for the first four information bits serves to identify a data transfer message type. By mapping these expressions/symbols to a corresponding single bit representation, the corresponding ninth bit can be decoded and placed in the nine bit message as is provided to the remote user interface as is otherwise described above.

I claim:

1. A method for use with an access control system and a remote user interface comprising:
- receiving a message from the access control system consisting of nine bits of information;
- wirelessly transmitting a message to the remote user interface that corresponds to the nine bits of information to provide a wirelessly transmitted message;
- receiving the wirelessly transmitted message;
- processing the wirelessly transmitted message to provide to the remote user interface a message consisting of the nine bits of information;
- wherein a ninth bit of information specifies a message type.

2. The method of claim 1 wherein the message type comprises either of a polling query type and a data transfer type.

3. The method of claim 2 wherein at least some bits within the nine bits of information other than the ninth bit of information identify a target remote user interface recipient.

4. The method of claim 1 wherein receiving a message from the access control system consisting of nine bits of information further comprises receiving an RS-485 compliant transmission.

5. The method of claim 4 wherein receiving a message from the access control system consisting of nine bits of information further comprises converting the RS-485 compliant transmission to an RS-232 compliant transmission.

6. The method of claim 5 wherein wirelessly transmitting a message to the remote user interface that corresponds to the nine bits of information to provide a wirelessly transmitted message further comprises converting the RS-232 compliant transmission to a message format that is not RS-232 compliant to provide the message to be transmitted to the remote user interface.

7. A method for use with an access control system and a remote user interface comprising:
- receiving a message from the access control system consisting of nine bits of information;
- wirelessly transmitting a message to the remote user interface that corresponds to the nine bits of information to provide a wirelessly transmitted message by converting the message consisting of nine bits of information into multiple message packets and wirelessly transmitting the multiple message packets to the remote user interface;
- receiving the wirelessly transmitted message;

processing the wirelessly transmitted message to provide to the remote user interface a message consisting of the nine bits of information.

8. The method of claim 7 wherein converting the message consisting of nine bits of information into multiple message packets further comprises converting the message consisting of nine bits of information into multiple eight bit message packets.

9. The method of claim 8 wherein converting the message consisting of nine bits of information into multiple eight bit message packets further comprises converting the message consisting of nine bits of information into two eight bit message packets.

10. The method of claim 9 wherein receiving a message from the access control system consisting of nine bits of information further comprises receiving a message from the movable barrier operator consisting of nine bits of information wherein a ninth bit of information specifies a message type.

11. The method of claim 10 wherein converting the message consisting of nine bits of information into two eight bit message packets further comprises converting the message consisting of nine bits of information into two eight bit message packets such that one of the two eight bit message packets represents only the information contained in the ninth bit.

12. An apparatus for use with at least one of an access control system and a remote user interface comprising:

an RS-485 interface to facilitate reception of nine bit messages;

a radio frequency transmitter that is operably coupled to the RS-485 interface to facilitate transmission of messages that correspond to the nine bit messages;

wherein the nine bit messages are either of only two types of message;

means for converting the nine bit messages into corresponding eight bit packets to be transmitted by the radio frequency transmitter;

wherein the means for converting is further for converting each of the nine bit messages into two corresponding eight bit packets to be transmitted by the radio frequency transmitter; and wherein the two types of message comprise a polling query type and a data transfer type of message.

13. An apparatus for use with at least one of an access control system and a remote user interface comprising:

an RS-485 interface to facilitate reception of nine bit messages;

a radio frequency transmitter that is operably coupled to the RS-485 interface to facilitate transmission of messages that correspond to the nine bit messages;

wherein the nine bit messages are either of only two types of message;

wherein the two types of message comprise a polling query type and a data transfer type of message; and wherein only one bit of each nine bit message identifies the type of message of that corresponding nine bit message.

14. The apparatus of claim 13 and further comprising means for converting the nine bit messages into corresponding eight bit packets to be transmitted by the radio frequency transmitter.

15. The apparatus of claim 14 wherein the means for converting is further for converting each of the nine bit messages into two corresponding eight bit packets to be transmitted by the radio frequency transmitter.

16. The apparatus of claim 15 wherein one of the eight bit packets represents only the one bit that identifies the type of message of the nine bits that comprise each nine bit message.

17. A method for use with a platform comprising at least one of an access control system and a remote user interface, the method comprising:

upon receiving a message from the platform consisting of nine bits of information:

wirelessly transmitting a message that corresponds to the nine bits of information to provide a wirelessly transmitted message and parsing the nine bits of information to provide a group of bits that comprise a message payload and a single bit that comprises a message type identifier;

upon receiving a wirelessly transmitted message, which wirelessly transmitted message corresponds to an original nine bits of information;

processing the wirelessly transmitted message to provide a message consisting of the original nine bits of information.

18. The method of claim 17 wherein the message type identifier comprises either of a poll query type identifier and a data transfer type identifier.

19. The method of claim 18 wherein wirelessly transmitting a message that corresponds to the nine bits of information further comprises:

forming a first data packet that contains the message payload and a second data packet that comprises the single bit;

wirelessly transmitting a message comprising the first and second data packet.

20. The method of claim 19 wherein forming a first data packet that contains the message payload and a second data packet that comprises the single bit further comprises forming a first data packet having eight bits and a second data packet having eight bits.

21. The method of claim 20 wherein processing the wirelessly transmitted message to provide a message consisting of the original nine bits of information further comprises processing a wirelessly transmitted message comprising first and second data packets.

22. The method of claim 21 wherein processing a wirelessly transmitted message comprising first and second data packets further comprises processing a wirelessly transmitted message comprising first and second data packets that each have eight bits.

23. The method of claim 22 wherein processing the wirelessly transmitted message to provide a message consisting of the original nine bits of information further comprises combining bits as selected from each of the first and second data packets to reconstitute the original nine bits of information.

24. The method of claim 23 wherein combining bits as selected from each of the first and second data packets to reconstitute the original nine bits of information further comprises using only one bit from one of the first and second data packets to combine with all of the bits of a remaining one of the first and second data packets.

25. The method of claim 24 wherein the only one bit comprises a message type identifier.

* * * * *